(12) United States Patent
Frissen et al.

(10) Patent No.: US 6,661,127 B2
(45) Date of Patent: Dec. 9, 2003

(54) DISPLACEMENT DEVICE

(75) Inventors: Petrus Carolus Maria Frissen, Eindhoven (NL); Johan Cornelis Compter, Eindhoven (NL); Michael Josepha Mathijs Renkens, Eindhoven (NL); George Arie Jan De Fockert, Eindhoven (NL); Rob Jacobus Matheus Coolen, Weert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 21 days.

(21) Appl. No.: 10/028,117

(22) Filed: Dec. 21, 2001

(65) Prior Publication Data

US 2002/0079888 A1 Jun. 27, 2002

(30) Foreign Application Priority Data

Dec. 27, 2000 (EP) .............................. 00204823

(51) Int. Cl.⁷ .............................................. H02K 41/00
(52) U.S. Cl. ....................... 310/12; 310/13; 324/207.24
(58) Field of Search ................... 310/12, 13; 324/207.2, 324/207.21, 207.24

(56) References Cited

U.S. PATENT DOCUMENTS

| | | | | |
|---|---|---|---|---|
| 3,831,352 A | * | 8/1974 | Takei .......................... | 310/12 |
| 4,151,447 A | * | 4/1979 | Von der heide et al. .... | 318/153 |
| 4,763,051 A | * | 8/1988 | Ruppert ...................... | 318/254 |
| 5,196,745 A | * | 3/1993 | Trumper ...................... | 310/12 |
| 5,886,432 A | * | 3/1999 | Markle ........................ | 310/12 |
| 5,925,956 A | | 7/1999 | Ohzeki ....................... | 310/90.5 |
| 6,064,128 A | * | 5/2000 | Yagoto et al. ................ | 310/12 |
| 6,069,418 A | * | 5/2000 | Tanaka ........................ | 310/12 |
| 6,072,251 A | * | 6/2000 | Markle ........................ | 310/12 |
| 6,129,277 A | * | 10/2000 | Grant et al. ................. | 235/449 |
| 6,274,953 B1 | * | 8/2001 | Hwang et al. ................ | 310/12 |
| 6,285,097 B1 | * | 9/2001 | Hazelton et al. ............. | 310/12 |

FOREIGN PATENT DOCUMENTS

WO   WO0191204   11/2001

* cited by examiner

*Primary Examiner*—Nestor Ramirez
*Assistant Examiner*—Leda T. Pham
(74) *Attorney, Agent, or Firm*—Aaron Waxler

(57) ABSTRACT

Positioning device having a first part (1) which is movable relative to a second part (2) in a X and Y-direction, said first part (1) having a carrier (5) on which a system of magnets (3) is arranged in a pattern of rows (7) and columns (8) parallel to the X- and Y-direction, respectively. The magnets in each row and column are arranged in a Halbach array, i.e. the magnetic orientation of each successive magnet in each row (7) and each column (8) is rotated through 90° counterclockwise. The second part (2) has an electric coil system (4) with two types of electric coils ($C_1$, $C_2$), one type having an angular offset of +45° and the other type having an offset of −45° with respect to the X-direction. The magnet configuration causes a very strong magnetic field. The positioning device has a number of magnetically sensitive sensors (Hall sensors 45) giving a signal which depends on the local mutual positions of the permanent magnets of the first part relative to the electric coils of the second part in an area in which the parts overlap.

6 Claims, 7 Drawing Sheets

DISPLACEMENT DEVICE

Figure 1:
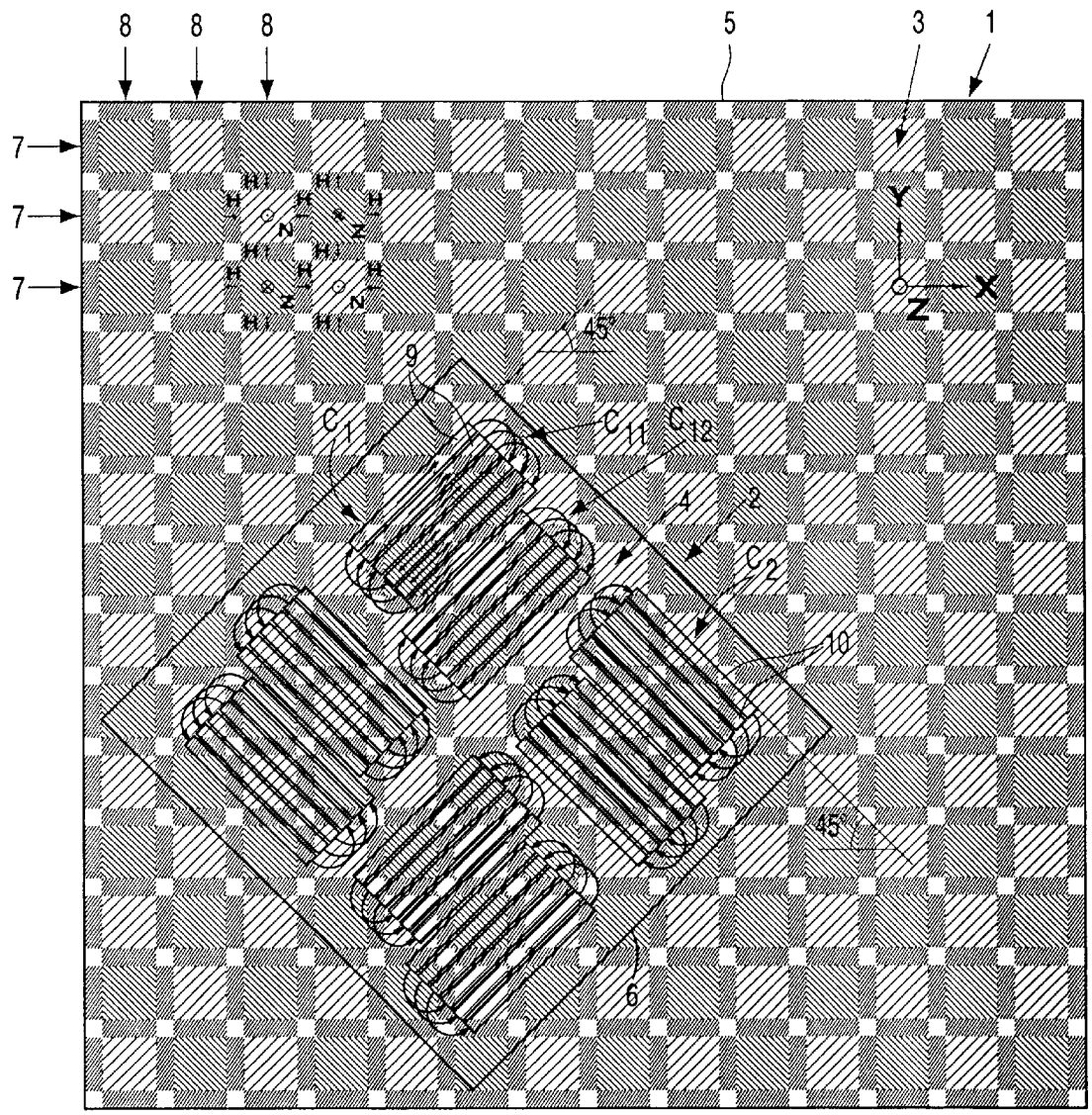

The invention relates to a displacement device as defined in the pre-characterizing part of claim 1.

Such a displacement device may be used, for example, in a wafer stepper for making integrated circuits. Very accurate and fast displacements in the X- and Y-directions can be obtained by means of the device. In addition, small displacements in a Z-direction perpendicular to the X- and Y-directions are also possible. The displacements are dependent on the phase and the value of the current through the coils. A so-called Halbach magnet configuration is used in the system of magnets. The magnets in a row of magnets are magnetized here such that the magnetization directions of each pair of mutually adjoining magnets are rotated 90° relative to one another. The use of such a magnet configuration leads to a stronger magnetic field at the coil side and accordingly to greater forces for displacing the parts relative to one another. U.S. Pat. No. 5,886,432 shows the use of a number of columns of magnets situated next to one another in accordance with the Halbach principle. The distance between the columns of magnets is equal to the width of a magnet here. Air is accordingly present between the columns.

The displacement possibility in the Z-direction allows a levitation of a first part relative to a second part which is movable relative to the first, which is a major advantage because it is made possible to displace the first part and the second part in the XY-plane relative to one another practically without friction with the aid of means which are present anyway. Various solutions are conceivable for the control of such a system, which means need not be fundamentally different from those used in similar systems where no electromagnetic levitation is used but where an air bearing is used for levitation by pneumatic forces, or some other kind of bearing for the displacements along the XY-plane.

The one part will bear on the other part previous to starting of the displacement device if levitation is used, because the levitation forces for separating the two parts from one another are not yet available at that moment. Many existing measuring systems capable of determining a position in an XY-plane operate incrementally, i.e. it is determined from an initial position through counting of steps where the one part is with respect to the other part. The measuring system has lost its position in the case of a power cut, which renders it necessary to find the initial position again upon a restart under the control of the system.

In the case of electromagnetic levitation in accordance with U.S. Pat. No. 5,886,432, moreover, it is necessary to have accurate information on the local positions of the electric coils of the second part relative to the magnets of the first part immediately during starting, because the control of the currents through the various electric coils present for obtaining the necessary levitation is dependent on information about the local positions.

The invention has for its object to provide a displacement device of the kind mentioned in the preamble which is capable of supplying the required accurate local position information also immediately upon starting.

The displacement device is for this purpose characterized in that the displacement device is provided with a number of sensors sensitive to magnetic fields, which sensors supply a signal which is dependent on the local mutual positions of the permanent magnets of the first part relative to the electric coils of the second part in the region where these two parts overlap.

The use of sensors sensitive to magnetic fields renders it possible for the first time to obtain direct information on the local position of the second part relative to the first part, even immediately during starting.

Preferably, the embodiment of the invention as defined in claim 2 is used. It is in fact possible to locate the sensors sensitive to magnetic fields within this part in a manner such that they are interfered with as little as possible by the interfering varying magnetic fields of the electric coils.

Various types of sensors sensitive to magnetic fields are in existence. Preferably, however, Hall sensors are used in accordance with claim 3. These are indeed eminently suitable for the envisaged aim thanks to their property that they are capable of measuring high static magnetic field strengths.

An embodiment of the invention as defined in claim 4 is strongly preferred. The use of one or several arrays of Hall sensors renders it possible to determine the position of the second part accurately within a pole pitch of the periodically recurring field of magnetic poles in the first part by means of suitable electronic circuits. This embodiment also has other advantages, as will be explained in more detail in the description of the Figures.

An embodiment of the displacement device as claimed in claim 5 is furthermore preferred. In this embodiment, the magnetic field is further optimized and the length of the array is defined such that the generated signal is as constant as possible in the case of a displacement of the array in the direction in which the array extends.

In the embodiment of the invention as claimed in claim 6, therefore, the arrays used can be fully identical in view of the occurring symmetries of the magnetic field profiles in both diagonal directions.

The embodiment of the invention as defined in claim 7 is preferably used. This embodiment, which will be explained in more detail in the description of the Figures, renders it possible to determine the position of the second part of the displacement device relative to the first part within a single pole pitch both in the X-direction and in the Y-direction through the use of no more than four identical Hall arrays placed at a distance from one another and through the use of suitable supporting electronics.

The further embodiment of the invention as claimed in claim 8 renders it possible in addition to measure small angular rotations of the second part relative to the first part of the displacement device in a suitable manner in that a difference is measured between the output signals of systems of Hall sensors which lie in one another's extended direction.

In the embodiment of the invention as claimed in claim 9, it is possible to derive from the amplitudes of the signals of two arrays belonging to one another the vertical distance between these arrays and the magnet plate, i.e. the vertical distance between the two parts of the displacement device.

The embodiment of claim 10 relates to an advantageous positioning of the Hall arrays relative to the electric coils of the second part of the displacement device for minimizing any interference which may be caused by the magnetic field of the electric coils. The positioning in accordance with this embodiment can ensure that the influence of the coils on the Hall sensors of an array are predictable and identical. Suitable compensation measures may accordingly be taken in the control electronics for compensating said influence.

Finally, a further embodiment as claimed in claim 11 was found to be advantageous. Linear arrays of Hall sensors each comprise a series of individual Hall sensors. These are found to have comparatively great differences in sensitivity to magnetic fields in practice, which makes it advantageous to have a possibility of individually adjusting the gain factor for each Hall sensor.

Figure 2:
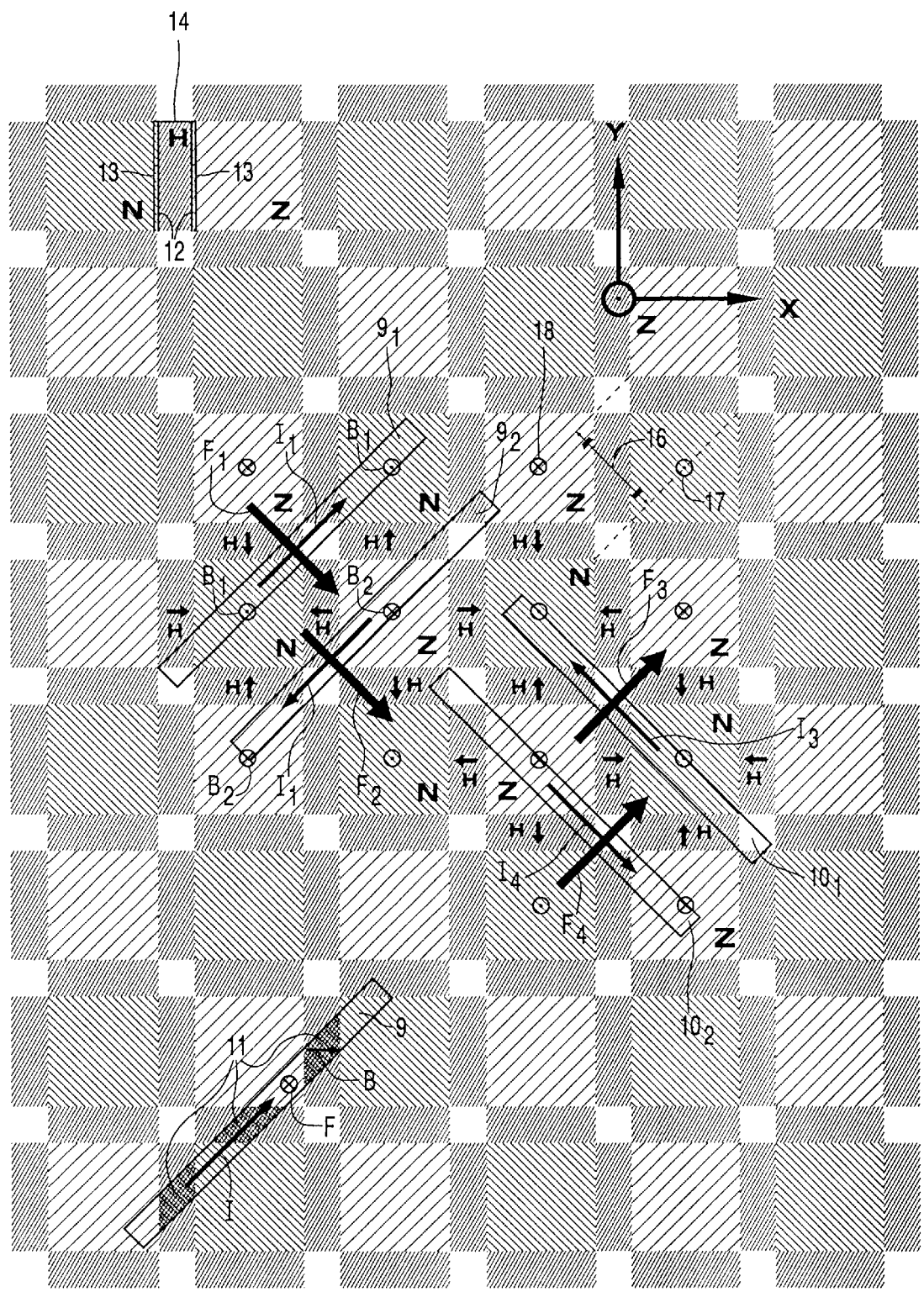
Figure 3:
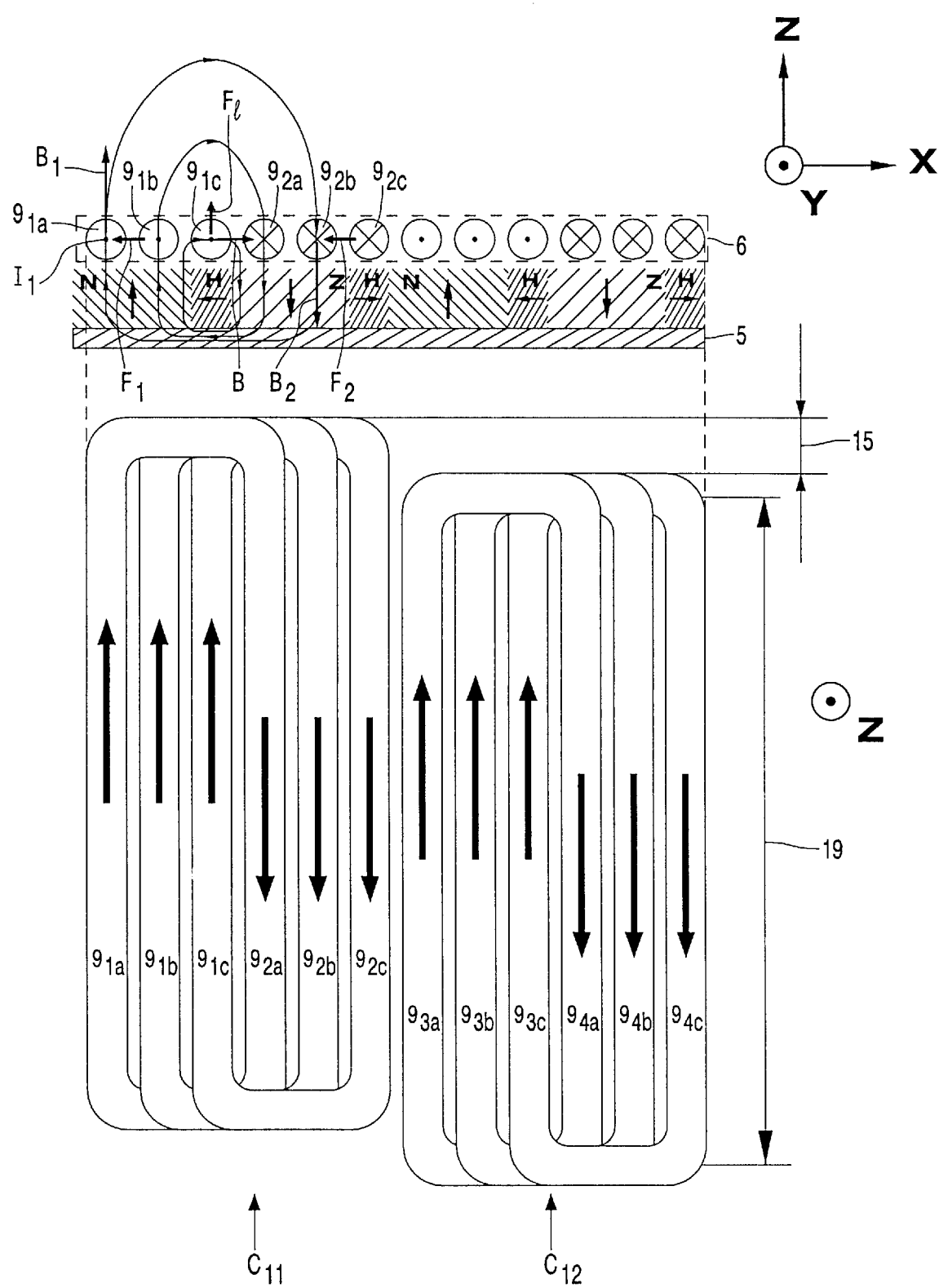
Figure 4:
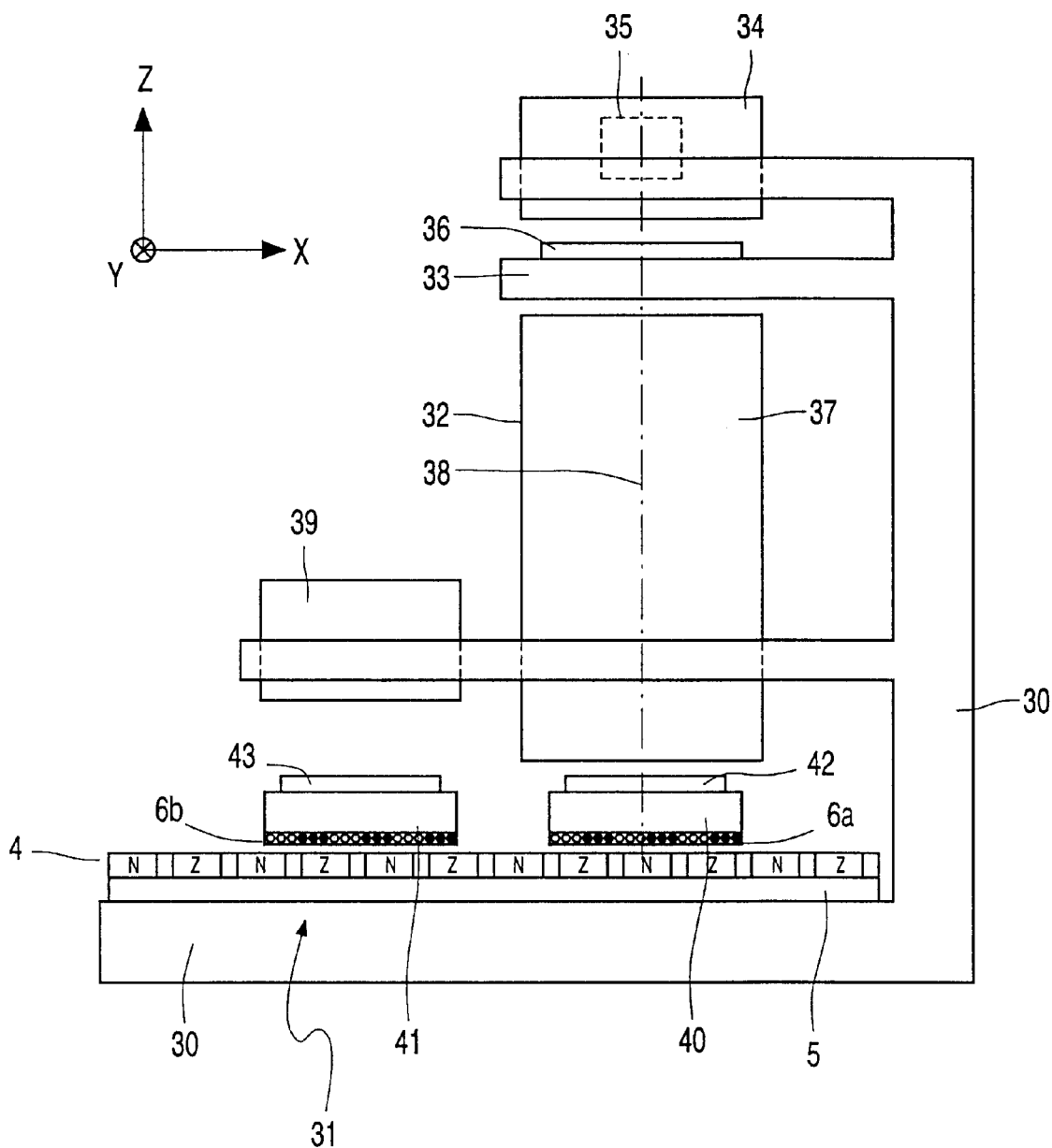
Figure 5A:
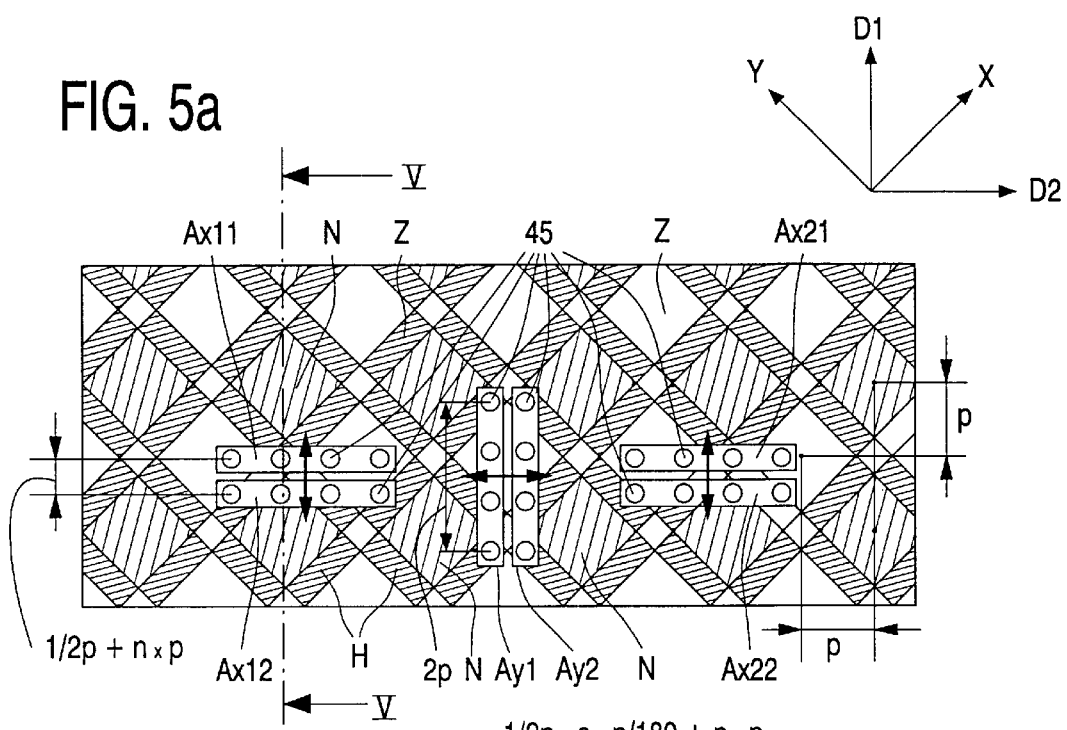
Figure 5B:
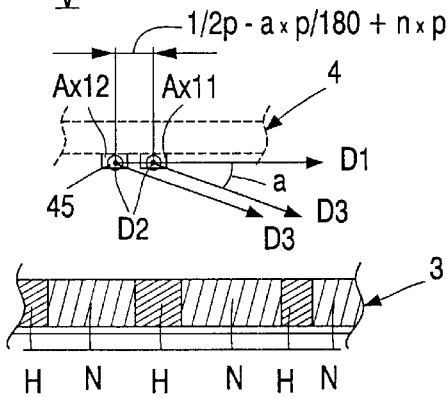
Figure 5C:
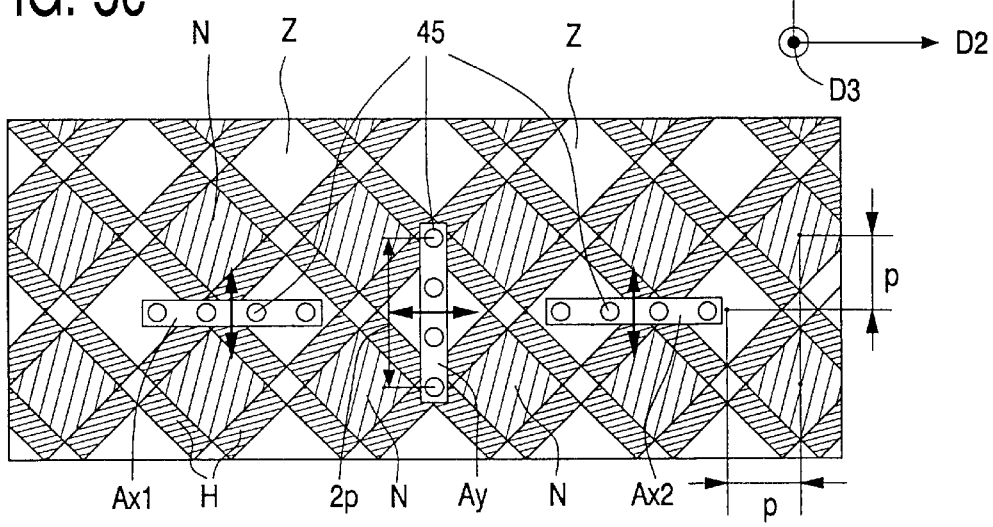
Figure 6:
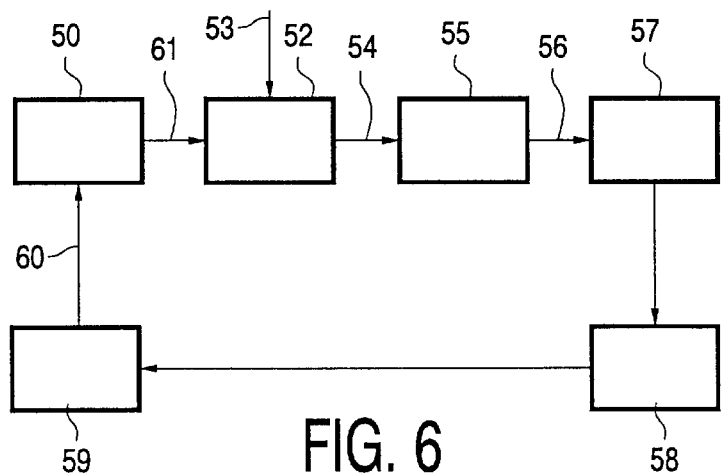
Figure 7:
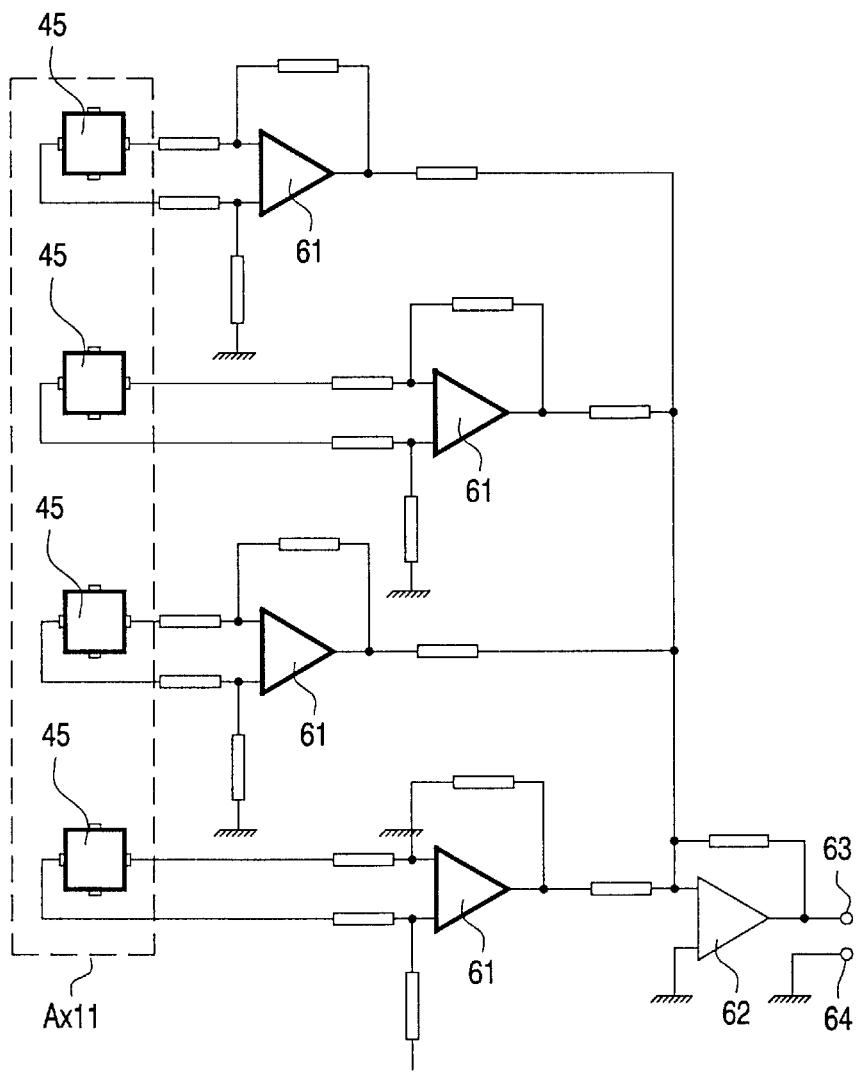
Figure 8:
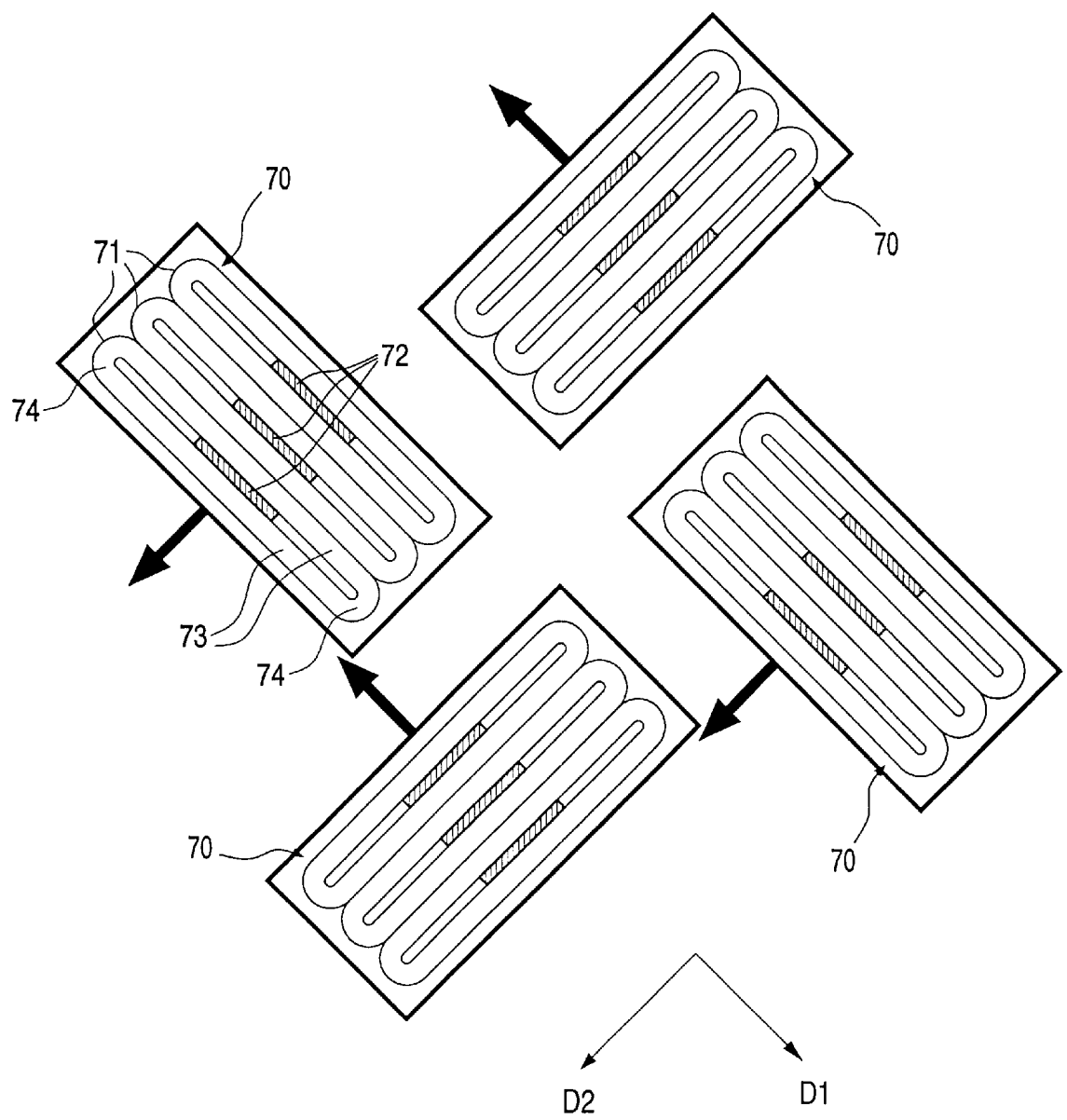

The invention will now be explained in more detail with reference to an example shown in a drawing, in which:

FIG. 1 is a diagrammatic plan view of the displacement device with the system of magnets and the system of electric coils arranged therein, FIG. 2 shows a detail of the plan view of FIG. 1, FIG. 3 is a cross-sectional view of the displacement device of FIG. 1, FIG. 4 shows an example of the use of the displacement device of FIG. 1 in a wafer stepper for the lithographic manufacture of integrated circuits, FIG. 5a is a diagrammatic plan view of a cut-out portion of the system of magnets of FIG. 1, indicating the positions of six arrays of Hall sensors arranged above the system of magnets, FIG. 5b is a cross-sectional view taken on the line V—V in FIG. 5a, FIG. 5c is a diagrammatic plan view of a cut-out portion of the system of magnets of FIG. 1 with an indication of the positions of three arrays of Hall sensors above the system of magnets, FIG. 6 is a strongly simplified diagram of a control system for controlling the position of the first part relative to the second part in the displacement device according to the invention, FIG. 7 is a diagram of a circuit for connecting the Hall sensors of an array to a summation amplifier via individual amplifiers so as to obtain an output signal of the array, and FIG. 8 is a diagrammatic perspective view of a possible arrangement of a system of coils with the positions of the Hall arrays between the coils.

The displacement device diagrammatically shown in FIG. 1 comprises a first part 1 which is formed by a system 3 of magnets and a second part 2 which is formed by a system 4 of electric coils. The magnets are fastened on a carrier 5, and the coil system is fastened on a coil block 6. The first part and the second part are capable of moving with respect to one another. Usually, the stationary part is formed by the carrier 5 with the magnets, and the movable part by the coil block 6. A displacement device of this kind is described in the international patent application PCT/EP00/07970 (PHN 17621), which was filed previously but was not published in time before the filing date of the present patent application, and whose contents are deemed to be included herein by reference.

The magnets are arranged on the carrier 5 in the following manner: the magnets are present in a pattern of rows 7 extending parallel to the X-direction and columns 8 extending parallel to the Y-direction, equal distances being present between the rows and between the columns. Magnets of a first kind N and of a second kind Z are positioned in alternation in each row 7 and in each column 8. The magnets of the first kind N have a magnetization direction perpendicular to the carrier and directed towards the second part with the system of electric coils, whereas the magnets of the second kind Z have a magnetization direction perpendicular to the carrier and directed away from the second part with the system of electric coils. A magnet of a third kind H is positioned between each pair of magnets of the first kind N and of the second kind Z in each row and in each column. The magnets of the third kind H present within the columns 8 have a magnetization direction which is parallel to the Y-direction and is directed towards the adjoining magnet of the first kind N, and the magnets of the third kind H present within the rows 7 have a magnetization direction also parallel to the X-direction and also directed towards the adjoining magnet of the first kind N. The magnetization directions of the various kinds of magnets N, Z, and H are indicated with arrows.

The system 4 of electric coils is provided with at least one coil of a first kind $C_1$ whose current conductors 9 present in the effective magnetic field of the magnets enclose an angle of 45° with the X-direction, and with at least one coil of a second kind $C_2$ whose current conductors 10, also present in the effective magnetic field of the magnets, enclose an angle of 45° with the X-direction and are perpendicular to the current conductors 9 of the coil of the first kind $C_1$. The current conductors being present in the effective magnetic field relate to that portion of the coil, usually a bundle of current conductors, which is present in the magnetic field of the magnets and on which an effective Lorentz force is exerted whereby a movement of the coil is caused.

The movement of the coils in the system of magnets will now be explained with reference to FIG. 2. Reference numerals $9_1$, $9_2$, $10_1$, and $10_2$ indicate current conductors of the coils $C_1$ and $C_2$, respectively, positioned in the magnetic fields of the magnets. The current conductor $9_1$ is situated mainly in the magnetic field of the magnets referenced N. The magnetization direction of these N-magnets is indicated by an arrow pointing upwards, i.e. perpendicular to the system of magnets and directed towards the current conductor $9_1$. The direction of the magnetic field is indicated by an arrow $B_1$ herein. If an electric current flows through the current conductor $9_1$ in the direction of an arrow $I_1$, a force $F_1$ will be exerted on the current conductor in the direction indicated by the relevant arrow, so that the current conductor will start moving in the direction of the arrow $F_1$. The current conductor $9_2$ is situated mainly in the magnetic field of the magnets referenced Z. The magnetization direction of these Z-magnets is indicated with an arrow $B_2$ pointing downwards, i.e. perpendicular to the system of magnets and directed away from the current conductor $9_2$. If an electric current flows through the current conductor $9_2$ in the direction of the arrow $I_2$, i.e. opposed to the current $I_1$, a force $F_2$ will be exerted on the current conductor $9_2$ in the direction of the relevant arrow, so that the current conductor will start moving in the direction of the arrow $F_2$, i.e. in the same direction as the arrow $F_1$. In the same manner, the current conductors $10_1$ and $10_2$, which are perpendicular to the current conductors $9_1$ and $9_2$, will exert forces in the direction of the arrows $F_3$ and $F_4$ under the influence of the magnetic fields of the N- and Z-magnets in the case of currents along the arrows $I_3$ and $I_4$. It is self-evident that, if the currents in the current conductors are reversed, the forces exerted on and the movements performed by the current conductors will also be reversed. This interplay of forces is also illustrated in FIG. 3.

Portions 11 of current conductors 9, 10 are also present above the magnets of the third type H and/or above regions where no magnet is present, i.e. between the magnets of the first kind N and the second kind Z (see FIG. 2, bottom left). These portions of the current conductors lie in a magnetic field B whose average direction is predominantly parallel to the X-Y-plane. See also current conductor $9_{1c}$ in FIG. 3. If a current I flows through this current conductor, a force F will be exerted on said portions of the current conductor perpendicular to the X-Y-plane, i.e. in the Z-direction. Depending on the direction of the current and on the position of the current conductor relative to the magnets, the force will be directed towards the magnets or away from the magnets. If the force is directed away from the magnets, this force is denoted the levitation force $F_1$, i.e. a force by which the current conductor is forced away from the magnets. Such a force may be used for obtaining an electromagnetic levitating bearing between the coil block and the magnets.

The magnets of the first kind N and of the second kind Z have a square shape. The magnets of the third kind H have an oblong shape of dimensions (see FIG. 2) such that the long sides 12 of a magnet H adjoin the sides 13 of a magnet N and a magnet Z, while the ratio of the dimension of the short side 14 to the dimension of the long side 12 of a magnet H lies between 0.25 and 0.50. It was found in an optimization analysis that the strength of the magnetic field per unit surface of the system of magnets is at its greatest then.

FIG. 3 shows two sets of three coils each, i.e. a first set $C_{11}$ with current conductors $9_{1a}$, $9_{1b}$, $9_{1c}$, and return current conductors $9_{2a}$, $9_{2b}$, $9_{2c}$, and a second set $C_{12}$ with current conductors $9_{3a}$, $9_{3b}$, $9_{3c}$ and return current conductors $9_{4a}$, $9_{4b}$, $9_{4c}$. Both sets of currents are supplied by a three-phase current system. The first set $C_{11}$ of three current conductors is positioned with a shift, seen in longitudinal direction of the current conductors, approximately equal to half the pole pitch 16 of the magnets with respect to the second set $C_{12}$ of three current conductors. The pole pitch 16 of the magnets is here defined as the distance of two mutually adjoining diagonal lines on which the centerlines 17 and 18 of magnets of the same kind N or Z are situated. If this measure is not taken, a fluctuating torque is applied to both sets of current-conducting coils during the movements, causing a kind of rocking movement of the moving part (coil block or carrier with magnets) relative to the stationary part about the Z axis. This rocking effect is substantially reduced by the shift of the sets of coils relative to one another, because a torque arising in one of the two sets of coils will compensate for the torque in the other one of the two sets of coils.

The length 19 of the current conductors is chosen such that it is equal to approximately k times the pole pitch 16 of the magnets (see FIG. 2), k being a multiple of 2. The sum of the magnetic field remains substantially constant upon a movement in the longitudinal direction of the current conductor in this case. Fluctuations in the force exerted on the current conductor are smaller then. This application is not dependent on the number of coils and phases.

FIG. 4 shows an example of the use of the displacement device in a wafer stepper for the lithographic manufacture of integrated circuits. The wafer stepper comprises a frame 30 for supporting a displacement device 31, a focusing unit 32, a mask holder 33, and a radiation source 34. The radiation source 34 is provided with a light source 35. A mask 36 provided with a pattern of an integrated semiconductor circuit can be placed on the mask holder 33. The focusing unit is an imaging or projection system provided with an optical lens system 37 with an optical axis 38. An identification unit 39 is further fastened to the frame 30. The displacement device 31 comprises the carrier 5 with the system of magnets 4 thereon. The carrier 5 is fastened on the frame 30. The displacement device further comprises a first and a second coil block 6a and 6b, each with a substrate holder 40, 41, on which respective semiconductor substrates 42 and 43 can be placed. The coil blocks can be levitated above the system of magnets 3 and can be directed with the substrate holders to any position in the X-Y-plane above the system of magnets independently of one another in that the electric currents through the coils of the coil blocks are correctly commutated. This has the advantage that actions such as the moving of the substrate holders from and to a loading/unloading position (not shown), an identification position (below the identification unit 39), and an exposure position (below the focusing unit 32) can be carried out simultaneously and fully independently of one another, whereby a greater capacity (output) is obtained. A bearing action between the substrate holder and the magnet surface can again be obtained in this construction owing to the levitation force.

If no current is flowing through the coils of the coil blocks 6, there is no electromagnetic levitation force, and the coil blocks will rest on the system of magnets 3 under the influence of gravity.

It will be assumed for simplicity's sake in the following description that the arrangement shown in FIGS. 1 and 2 is in horizontal position, the first part 1 of the displacement device being stationary and the second part 2 of the displacement device being displaceable above the stationary part 1.

If no current is passed by the coils of the coil block 6, for example owing to a power failure or because the device has been switched off, the coil block 6 will rest on the stationary part 1 of the displacement device under the influence of gravity. A correct commutation of the various coils of the coil block 6 is necessary if the coil block 6 is to be electromagnetically levitated and displaced in directions along the XY-plane in a controllable manner.

The displacement device is for this purpose provided with a number of sensors sensitive to magnetic fields, which sensors supply a signal which is dependent on the local mutual positions of the permanent magnets of the first part 1 relative to the electric coils of the second part 2 in the region where they overlap. Preferably, the sensors sensitive to magnetic fields are present in the portion in which the coil systems are present, i.e. in the movable part 2 in the present case.

FIG. 5a is a diagrammatic overview of the placement of a number of sensors sensitive to magnetic fields, which in this case are presumed to be Hall sensors. The sensors are referenced 45 and are arranged in linear arrays, in this case each comprising four Hall sensors 45 referenced Ax11, Ax12, Ax21, Ax22, Ay1 and Ay2. These arrays of Hall sensors, which are connected to the movable coil block in the example discussed here, are depicted as lying above a portion of the stationary first part 1 of the displacement device. FIG. 5a shows a system of coordinates XY which corresponds to the system of coordinates XY of FIG. 2, as well as a system of coordinates comprising the two diagonals D1–D2 which are mutually perpendicular and perpendicular to the XY-axes.

Magnets of the third kind H are arranged between the magnets of the first kind N and the magnets of the second kind Z, as was discussed above. Furthermore, as was discussed above, the magnets of the first N and the second kind Z are of square shape and mutually identical. The distance between two mutually adjoining diagonal lines on which the center points of magnets of the same kind, N or Z, are situated is denoted the pole pitch and is indicated with the letter p in FIG. 5a. The length of each of the linear arrays Ax11 to Ay2 in the embodiment shown is equal to this pitch distance p. The linear arrays Ax11, Ax12, Ax21, and Ax22 extend in a first diagonal direction D2, and the two arrays Ay1 and Ay2 extend in a second diagonal direction D1 perpendicular to D2.

When an array is displaced in the direction of the diagonal along which the array extends, the average of the signals generated by the Hall sensors of the relevant array will have an approximately constant value because the length of the array, i.e. the distance between the centers of the outermost Hall sensors of an array, is equal to twice the pole pitch p, apart from a certain ripple on the signal. This ripple may be reduced in that the number of Hall sensors in an array is increased and/or the length of the array is increased, so that it no longer has a length equal to twice the pole pitch p but, for example, equal to 2p, 4p, . . . , i.e. 2np with n=1, 2, 3, . . . If on the other hand an array is displaced in a direction perpendicular to the diagonal along which the array extends, a periodically variable signal is measured by each of the Hall sensors of the array, the period whereof is equal to the pole pitch p of the subjacent magnetic field. Obviously, one Hall sensor of an array will measure a signal different from the signal measured by another Hall sensor of this same array. Joining together of the signals of all Hall sensors of an array in a suitable manner, however, leads to a sinusoidally varying signal with the period or cycle p. Looking at FIG. 5a, therefore, it may be said that the Hall arrays Ax11, Ax12, Ax21, and Ax22 are sensitive to variations in the subjacent magnetic field in the direction D1 but not in the direction D2. On the other hand, the arrays Ay1 and Ay2 are sensitive to displacements in the direction D2 and not in the direction D1. The local position of the system of coils can be measured within a single pole pitch in the directions D1 and D2 through a suitable combination of the signals originating from the various arrays, i.e. in two dimensions above the stationary part 1 of the displacement device.

The two linear arrays Ax11 and Ax12 form a system of two mutually adjacent arrays of the same orientation having a mutual distance of ½p+n×p, with n=1, 2, 3, . . . The same is true for the two linear arrays Ax21 and Ax22 and the two linear arrays Ay1 and Ay2. In the embodiment shown in FIG. 5, therefore, each array of Hall sensors belongs to a system of two mutually adjacent arrays of the same orientation having a mutual distance of ½p+n×p. The object of this dual arrangement is to enable a measurement not only of the local position of the movable part of the displacement device relative to the stationary part, but also a determination of the direction of the displacement. If, for example, the two linear arrays Ax11 and Ax12 are displaced along the D1 axis in a direction from bottom to top in the drawing, then the signal measured by the array Ax11 will be ahead of the signal measured by the array Ax12 by one quarter cycle. This phase shift is reversed if the system of the two arrays is displaced from top to bottom as shown in the drawing. The direction of the displacement may thus be readily derived from this phase difference. The direction of movement along the D2 axis may be determined in the same manner by means of the system of arrays Ay1, Ay2.

As FIG. 5a shows, the system of arrays Ax21 and Ax22 is situated at a distance from and in the extension of the system Ax11, Ax12. This provides a possibility of measuring small rotations of the movable part of the displacement device with respect to the stationary part. In FIG. 5, for example, a small rotation of the movable part of the displacement device relative to the stationary part will have the result that the system Ax11, Ax12 assumes a different local position with respect to the subjacent local magnetic field, and accordingly generates a different output signal than does the system Ax21, Ax22. The extent of the angular rotation may be ascertained from this difference.

It is alternatively possible to use sensors having two directions in which they are sensitive to magnetic fields. If, for example, the sensors 45 of the two linear arrays Ax11 and Ax12 are magnetically sensitive in the direction D1 and in a direction D3 which encloses an angle a (in degrees) over the axis D2 with the direction of D1, the mutual distance of these arrays must be equal to ½p−a×p/180+n×p, with n=1, 2, . . . This is clarified in FIG. 5b, which is a cross-sectional view taken on the line V—V in FIG. 5a. The distance between the system of magnets 3 and the system of coils 4 supporting the sensors is depicted with an exaggerated size for reasons of clarity. The same is true for the sensors of the other pairs of arrays, with the proviso that the sensors of the arrays Ay1 and Ay2 are sensitive to magnetic fields in the directions D2 and D3. If the angle a is equal to 90°, the arrays can coincide for n=0. In this situation, in which the magnetically sensitive direction D3 is perpendicular to the directions D1 and D2, one array Ax1, one array Ax2, and one array Ay can suffice. An example of this is shown in FIG. 5c, where the sensors 45 in the linear arrays Ax1 and Ax2 are accordingly sensitive in the directions D1 and D3, whereas the sensors 45 in the linear array Ay perpendicular thereto are sensitive in the directions D2 and D3, said directions D1, D2, and D3 being perpendicular to one another, as is shown in the drawing. This embodiment accordingly requires only half the number of arrays with sensors compared with the embodiment of FIG. 5a. This also saves space.

FIG. 6 diagrammatically shows the control system used for positioning the movable part of the displacement device relative to the stationary part through measurement of the local position by means of Hall sensors and a corresponding commutation of the relevant coils of the coil block. Passing the correct currents through the coils also renders it possible to levitate the movable part relative to the stationary part. A digital signal processor is used for determining the position of the coil block above the stationary part of the displacement device. The block 50 of the control circuit is used for calculating the positions of the Hall sensor arrays and accordingly of the coil system of the coil block with respect to the magnets of the stationary part 1 of the displacement device situated therebelow. The output signal 51 of the block 50 is accordingly a position signal indicating the local position in the directions X and Y and is supplied to the block 52 which comprises the commutation algorithm. The block 52 receives as a further input signal an adjustment signal 53 for the desired force or desired torque to be exerted on the movable part of the displacement device. The output signal 54 is supplied to a power amplifier 55 whose output signal 56 is fed to the coil block 57. The signal 56 comprises the currents which are to be sent to each of the coils of the coil block 57. The forces exerted on the coils of the coil block as a result of this lead to a displacement, symbolized by the block 58, of the coil block, whereby a local change arises in the position of the coil block relative to the subjacent magnetic field. Position signals are generated by the systems of arrays of Hall encoders, symbolized by the block 59, the output signal 60 is supplied to the block 50 again for position determination. Not shown in the diagram are additional arrangements which serve to compensate for the influences of the magnetic fields generated by the electric coils on the various Hall arrays. Since these influences can be predicted, suitable compensation measures can be incorporated. It is also possible to determine from the amplitudes of the signals of two arrays belonging together the vertical distance between the arrays and the magnet plate, and thus the vertical distance between the coil block and the magnet plate.

FIG. 7 finally illustrates a circuit which may be used for forming an average position signal by means of the four Hall sensors 45 of the Hall sensor array Ax11, symbolically indicated with a broken-line frame. Each of the Hall sensors is for this purpose connected to an individual differential amplifier 61 which is known per se, the joint output signals thereof being summed by an operational amplifier 62 so as to form an average output voltage at terminal 63 with respect to a ground terminal 64. A major advantage of the use of individual differential amplifiers 61 for the Hall sensors 45 is that the gain factors of the differential amplifiers may be adapted to the sensitivities of the respective Hall sensors, the object being to provide an output signal from each Hall sensor which is not affected by mutual differences in gain factors.

Although the invention was described above with reference to a number of embodiments in the field of so-called wafer steppers, the invention is by no means limited to such embodiments, but instead covers all embodiments possible within the scope of the appended independent claim 1. The invention may thus be used in other displacement devices in which a movable part is to be displaced relative to a stationary part or relative to another movable part. It is essential for the invention that a local position determination of the one part with respect to the other part takes place through the use of sensors sensitive to the magnetic field of the permanent magnets, so that a local position determination can take place relative to the subjacent magnetic field even in the stationary state. Hall sensors are advantageously used for this because these sensors are suitable for processing strong magnetic fields. In principle, however, it is by no means impossible to use alternative kinds of sensors sensitive to magnetic fields. The use of arrays of sensors sensitive to magnetic fields and having a length equal to the pole pitch or to several times the pole pitch of the magnetic field is advantageous; however, the length of the array may be different from that indicated above and shown in the drawings, and the number of magnetically sensitive sensors per array may be greater or smaller than discussed and shown. The coils may be arranged in configurations other than that shown in FIG. 3. Reference is made to FIG. 8 for an example of this.

FIG. 8 shows four coil systems 70 which extend two-by-two in the same direction D1 and in the same direction D2 at regular distances from one another. Each of the coil systems 70 comprises three coils 71 situated in the same plane, which is indicated for only one of the coil systems 70. Linear Hall arrays 72 are positioned within each of the coils 71, again indicated for only one of the coil systems. The electric coils 71 are substantially rectangular in shape and accordingly have mutually opposed, parallel straight sides, for example the two sides 73 indicated for one of the coils in FIG. 8. The electric coils 71 of each coil system are arranged with their mutually corresponding sides 73 in parallel, while each linear array 72 is positioned so as to be parallel to the sides of the immediately adjacent electric coil and at equal distances to the ends 74 thereof.

What is claimed is:

1. A displacement device with a first part and a second part which are displaceable relative to one another in at least an X-direction and a Y-direction perpendicular thereto, wherein said first part has a carrier which extends substantially parallel to said X-direction and said Y-direction and on which a system of magnets is fastened in a pattern of rows extending parallel to said X-direction and columns extending parallel to said Y-direction, wherein an equal distance is present each time between the rows and between the columns, wherein in each said row and in each said column magnets of a first kind (N) with a magnetization direction perpendicular to said carrier and directed to said second part and magnets of a second kind (Z) with a magnetization direction perpendicular to said carrier and directed away from said second part are positioned in alteration, and wherein a magnet of a third kind (H) with a magnetization direction directed from a magnet of said second kind (Z) to a magnet of said first kind (N) is arranged between the magnets of said first kind (N) and said second kind (Z), while said second part is provided with a system of electric coils with at least one electric coil of a first kind (C1), with current conductors situated in a magnetic field of said system of magnets and enclosing an angle of substantially 45° with said X-direction, and with at least one electric coil of a second kind (C2), also with current conductors situated in said magnetic field of said system of magnets and enclosing an angle of substantially 45° with said X-direction but directed perpendicular to said current conductors of said first electric coil (C1), wherein said displacement device is provided with a number of sensors sensitive to magnetic fields, which sensors supply a signal which is dependent on the local mutual positions of said magnets of said first part relative to said electric coils of said second part in a region where these two parts overlap, said sensors sensitive to magnetic fields being Hall sensors which are situated at regular distances to one another, and wherein said magnets of said first kind (N) and said second kind (Z) are of an identical square shape with equal sides, and said magnets of said third kind (H) have an oblong shape with longer sides and shorter sides, said longer sides being equally long as said equal sides of said magnets of said first kind (N) and said second kind (Z), while the ratio of the length of said shorter side of said magnet of said third kind (H) to the length of said longer side thereof lies between 0.25 and 0.59.

2. The displacement device of claim 1, wherein the distance between the centers of the outermost Hall sensors of a linear array is equal to 2n×p, with n∈{1, 2, 3, . . .}, and p is the pole pitch of poles of equal orientation of the magnets of said first part in a diagonal direction in said XY-plane at an angle of −45° or +45° to said X-direction and said Y-direction.

3. The displacement device of 2, wherein said linear arrays present at least comprise a first linear array in a first diagonal direction and a second linear array in a second diagonal direction perpendicular to said first.

4. The displacement device of claim 3, wherein said first linear array belongs to a system of two arrays of the same orientation situated next to one another at a mutual distance of ½p+n×p, and the second linear array belongs to a system of two arrays of equal orientation situated next to one another at a mutual distance of ½p+n×p, with n∈{1, 2, 3, . . . }.

5. The displacement device of claim 4, wherein a third system of linear arrays is present at a distance from and in the extended direction of one of said two other arrays.

6. The displacement device of claim 4, wherein the vertical distance between said first and said second part can be determined from amplitudes of signals of said sensors of two arrays that belong to one another.

* * * * *